July 15, 1952   W. H. AVERY   2,603,061
ROCKET LOADING ARRANGEMENT
Filed Aug. 20, 1946

Inventor
William H. Avery

By M. O. Hayes

Attorney

Patented July 15, 1952

2,603,061

UNITED STATES PATENT OFFICE 2,603,061

ROCKET LOADING ARRANGEMENT

William H. Avery, Silver Spring, Md., assignor to the United States of America as represented by the Secretary of the Navy Application August 20, 1946, Serial No. 691,831

4 Claims. (Cl. 60—35.6)

This invention relates to propulsion units for assisting aircraft in taking off and more particularly to methods and arrangements for loading or charging such units.

It is a common practice to secure propulsion units to aircraft to furnish an initial thrust for assisting the aircraft in taking off. Such units commonly comprise a shell or casing within which a propellant is burned. The products of combustion emerge through an orifice or nozzle in the rear of the shell and thereby impart a forward thrust to the aircraft by a rocket action. After such units have served their purpose, they are ordinarily jettisoned from the aircraft.

Objects of the present invention are to provide improved methods and arrangements for loading and supporting propellant charges in units of the character described: to provide improved loading arrangements that leave ample free space for passage of gases around the unburned propellant; to provide as an article of manufacture a propulsion unit loaded in accordance with the methods and arrangements referred to; and to provide for carrying out the foregoing objects in a facile, economical and efficient manner.

Figure 1:
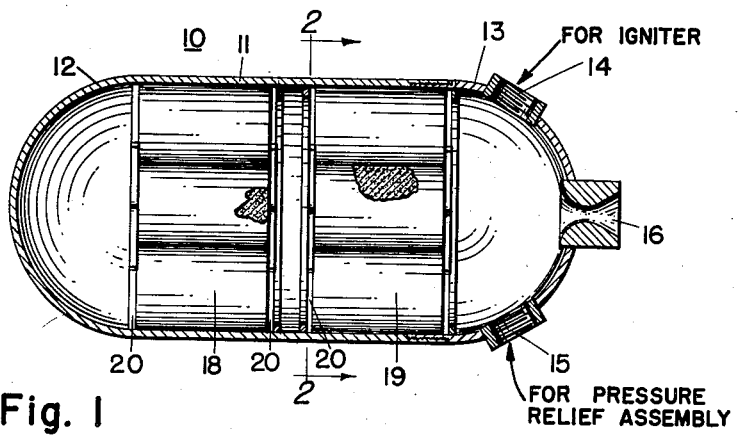
Figure 2:
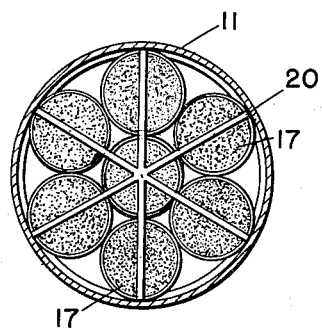

In accomplishing these and other objects of the present invention, I have provided improved methods and details of structure, a preferred form of which is shown in the accompanying drawing, wherein:

Fig. 1 is a longitudinal sectional view through a propulsion unit constructed and loaded in accordance with the present invention; and Fig. 2 is a cross-sectional view of the unit shown in Fig. 1, taken substantially on the line 2—2 of Fig. 1.

Referring more in detail to the drawing:

There is shown at 10 a propulsion unit that comprises a substantially cylindrical shell or casing 11, preferably having a rounded forward end 12. The rearward end of the casing has a rounded cover member 13 removably secured thereto, as by the threaded engagement illustrated. The cover member contains a pair of apertures 14 and 15 to receive an igniter assembly and an excess pressure relief assembly, not shown, since they do not constitute a part of the present invention. An exhaust nozzle 16 is secured to the cover member adjacent the center thereof and provides an orifice for normal escape of the products of combustion that impart the thrust to the aircraft. The structure thus far described is known and does not per se form a part of the present invention.

The present invention relates to improved arrangements for loading propellant charges within the unit.

In accordance with the present invention a plurality of cartridges 17 are provided. Each of said cartridges includes a substantially cylindrical container, preferably formed of thin gauge sheet metal, within which is loaded the propellant material. Such material may be any known composition suitable for the purpose.

The cartridges 17 are loaded within the casing 11 in groups of seven, placed with one cartridge in the center and the other six cartridges tangential to the central cartridge and to the adjacent cartridge on either side. The inside diameter of the casing is approximately three times that of the outside diameter of the cartridges, whereby the groups of seven cartridges fit snugly within the casing.

I prefer to load the casing with two groups of seven cartridges each, designated respectively 18 and 19. The cartridges are retained in longitudinal position within the casing by a plurality of positioning spiders 20 fitted snugly within the casing.

In operation one or more casings loaded as described are secured to an aircraft prior to the takeoff. The cartridges of propellant are ignited by an igniter assembly, not shown, preferably to burn from each end. The gases produced by combustion of the propellant flow through the spaces between the cartridges and emerge through the nozzle 16, which is directed rearwardly with respect to the aircraft. The emergence of the gases through the nozzle has a rocket effect and thereby assists in the take-off of the aircraft.

It is seen that the improved loading arrangement enables the cartridges to be burned from each end and also provides a considerable open area between adjacent cartridges through which the products of combustion may flow to the exhaust nozzle.

While I have shown but a single embodiment of the present invention, it is obvious that the device is subject to modification without departing from the spirit of the invention. I do not wish therefore to be limited by the disclosure set forth, but only by the scope of the appended claims.

What is claimed is:

1. A propulsion device for assisting an aircraft in takeoff, comprising a substantially cylindrical casing open at one end, a back end plate acting to close said open end, a nozzle mounted on said back end plate axially of said casing, a plurality of propellant charge units mounted within said casing, each of said units being of elongated cylindrical shape, the lateral surfaces of said units being sheathed in incombustible material, said units being mounted with their axes parallel to the axis of the casing so that the cross-sectional area between the units remains constant during burning.

2. A propulsion device for use in assisting an aircraft in takeoff, comprising a substantially cylindrical casing having a substantially hemispherical forward end, a substantially hemispherical back end plate secured to said casing, an exhaust nozzle mounted on said back end plate axially of the casing, a plurality of propellant units of elongated right cylindrical shape situated in the cylindrical portion of the casing, said units being situated with their axes parallel to the axis of the casing and being coextensive with one another, each of said units being formed of slow-burning powder with the lateral surface sheathed in sheet metal to inhibit burning thereof, the units being sufficient in number to pack within the wall of the casing and to be self-supporting, spiders extending transversely of the casing to prevent longitudinal movement of the units.

3. A propulsion device for use in assisting an aircraft in takeoff, comprising a casing having a substantial cylindrical portion, an exhaust nozzle mounted at one end of the casing axially of the cylindrical portion, a group of propellant units of elongated right circular cylindrical shape situated coextensively in the cylindrical portion of the casing with their axes parallel to the axis of the cylindrical portion and being sufficient in number to be self-supporting laterally, each of said units being formed of slow-burning powder with the cylindrical surface sheathed in inhibiting material so that only the end surfaces are permitted to burn, and spiders extending transversely of the casing to prevent longitudinal movement of the units.

4. A propulsion device as recited in claim 3 wherein at least one other group of propellant units is situated in said cylindrical portion and is separated from the first-mentioned group by a substantial distance.

WILLIAM H. AVERY.

REFERENCES CITED

The following references are of record in the file of this patent:

UNITED STATES PATENTS

| Number | Name | Date |
|---|---|---|
| 249,192 | Mallory | Nov. 8, 1881 |
| 2,405,415 | Eksergian | Aug. 6, 1946 |
| 2,412,173 | Pope | Dec. 3, 1946 |
| 2,422,721 | Farr | June 24, 1947 |
| 2,446,560 | Skinner | Aug. 10, 1948 |
| 2,471,745 | Hickman | May 31, 1949 |
| 2,478,958 | Wheeler | Aug. 16, 1949 |

FOREIGN PATENTS

| Number | Country | Date |
|---|---|---|
| 516,865 | Great Britain | Jan. 12, 1940 |